(12) United States Patent
LaPasta et al.

(10) Patent No.: US 8,721,340 B2
(45) Date of Patent: May 13, 2014

(54) SYSTEM AND METHOD FOR EVALUATING JOB CANDIDATES

(71) Applicant: Skill Survey, Inc., Berwyn, PA (US)

(72) Inventors: Douglas G. LaPasta, Hawley, PA (US); Martha Mincer, Milford, PA (US)

(73) Assignee: Skill Survey, Inc., Berwyn, PA (US)

( * ) Notice: Subject to any disclaimer, the term of this patent is extended or adjusted under 35 U.S.C. 154(b) by 0 days.

(21) Appl. No.: 13/960,426

(22) Filed: Aug. 6, 2013

(65) Prior Publication Data
US 2013/0332382 A1 Dec. 12, 2013

Related U.S. Application Data

(63) Continuation of application No. 10/912,433, filed on Aug. 4, 2004.

(60) Provisional application No. 60/492,457, filed on Aug. 4, 2003.

(51) Int. Cl.
*G09B 19/00* (2006.01)

(52) U.S. Cl.
USPC .......................................................... 434/219

(58) Field of Classification Search
CPC ............ G09B 19/00; G09B 3/00; G06F 7/00; G06F 17/60; G06F 17/30; G09G 5/00
USPC ......... 434/156, 185, 308, 318, 319, 320, 107, 434/115, 219, 322, 323, 325, 307 R, 363, 434/365, 350; 705/9, 10; 700/108; 709/223; 345/440
See application file for complete search history.

(56) References Cited

U.S. PATENT DOCUMENTS

| | | | | |
|---|---|---|---|---|
| 5,884,270 | A * | 3/1999 | Walker et al. | 705/321 |
| 6,904,407 | B2 * | 6/2005 | Ritzel | 705/321 |
| 2003/0037032 | A1 * | 2/2003 | Neece et al. | 707/1 |
| 2003/0071852 | A1 * | 4/2003 | Stimac | 345/810 |
| 2004/0053203 | A1 * | 3/2004 | Walters et al. | 434/350 |

OTHER PUBLICATIONS

WEM RefCheck, Looking for a better way to check references?, http://www.wrdi-institute.com/assets/docs/brochures/wemrefcheck. pdf, Dec. 31, 2002, 2 pages.*

* cited by examiner

*Primary Examiner* — Kesha Frisby
(74) *Attorney, Agent, or Firm* — Greenberg Traurig, LLP

(57) ABSTRACT

Human resource system for collecting and analyzing survey data from reference providers identified by a job candidate for use by an employer. The system sends an electronic communication to the reference providers to request completion of survey questions and electronically receives the survey data from the reference providers, preferably through webpages. An analysis module combines the received survey data from the reference providers and generates a confidential candidate report for an employer which excludes identification of any ratings or comments by any reference providers. The system also generates customized interview probe questions for use during job interviews and coaching tactics for use after the hiring, based on the weak areas that have been identified from the completed surveys in order to assist the hiring manager to bring the new hires up to speed quickly and effectively.

8 Claims, 24 Drawing Sheets

TO ANSWER QUESTIONS:
Please answer each question throughout the survey by clicking on the appropriate button under the number that best describes the extent to which you feel Mark Candidate uses these skills.

If you cannot answer a particular question please leave it blank.

AS YOU READ EACH QUESTION, PLEASE KEEP IN MIND:

EXTENT SCALE

| 1 | 2 | 3 | 4 | 5 | 6 | 7 |
|---|---|---|---|---|---|---|
| Never | Little Extent | Some Extent | Moderate Extent | Great Extent | Very Great Extent | Always |

NOTE – By scoring a candidate a "7" on any item, you are indicating that the candidate uses the skill *at all times and under all circumstances*. By scoring a "1" you are indicating that they *never* use this skill *under any circumstances*.

Your responses are personal and do not reflect the views of any company/organization to which you belong now or to which you have belonged in the past.

| | To what extent does Mark Candidate | Never 1 | 2 | 3 | 4 | 5 | 6 | Always 7 |
|---|---|---|---|---|---|---|---|---|
| 1. | Focus resources and energy on activities that will achieve the greatest results? | ○ | ○ | ○ | ○ | ○ | ○ | ○ |
| 2. | Show resourcefulness in getting results under new or undefined business conditions? | ○ | ○ | ○ | ○ | ○ | ○ | ○ |
| 3. | Continue to pursue goals despite problems and setbacks by demonstrating confidence, persistence, and a sense of urgency? | ○ | ○ | ○ | ○ | ○ | ○ | ○ |
| 4. | Seek commitment rather than passive acceptance to goals and priorities in working with others? | ○ | ○ | ○ | ○ | ○ | ○ | ○ |
| 5. | Work with others to establish clear and realistic roles, responsibilities, and goals, as well as effective plans to reach goals? | ○ | ○ | ○ | ○ | ○ | ○ | ○ |
| 6. | Value and accommodate diversity? | ○ | ○ | ○ | ○ | ○ | ○ | ○ |
| 7. | Listen intently to fully understand the needs and perspectives of others? | ○ | ○ | ○ | ○ | ○ | ○ | ○ |
| 8. | Demonstrate a genuine commitment to helping other people improve their effectiveness and succeed (e.g., by fully sharing information, expertise and resources), rather than always serving his/her own needs? | ○ | ○ | ○ | ○ | ○ | ○ | ○ |
| 9. | Give helpful and constructive (rather than negative or punishing) feedback on the performance of others? | ○ | ○ | ○ | ○ | ○ | ○ | ○ |
| 10. | Recognize and praise others' efforts and accomplishments? | ○ | ○ | ○ | ○ | ○ | ○ | ○ |
| 11. | Focus on getting results for the business rather than on "turf" issues? | ○ | ○ | ○ | ○ | ○ | ○ | ○ |
| 12. | Work to build strong networks with peer level managers, boss, and all support areas? | ○ | ○ | ○ | ○ | ○ | ○ | ○ |
| 13. | Encourage team members to develop strong positive relationships with each other? | ○ | ○ | ○ | ○ | ○ | ○ | ○ |
| 14. | Show support for the organization, its values, and its goals? | ○ | ○ | ○ | ○ | ○ | ○ | ○ |
| 15. | Take personal responsibility for his/her actions and results, without blaming others or making excuses? | ○ | ○ | ○ | ○ | ○ | ○ | ○ |
| 16. | Demonstrate high standards of personal integrity and credibility? | ○ | ○ | ○ | ○ | ○ | ○ | ○ |

FIG. 8A

COMMENTS

No matter how you rated Mark please type in below at least one area of "Strength" and one area in which the candidate "Could Improve."

This information is also anonymous. No one will be identified in the report as having written the comment.

Strengths:

Could Improve:

FIG. 8B

Dear Mark,

Congratulations on your opportunity to become a District Manager with Alpha Insurance Co.. As already explained to you, a critical step in the selection process is to electronically survey your references. SkillSurvey, a leader in Web-based referencing, is the third-party service bureau that conducts this survey.

Click on the link below. It takes you to an on-line form where you can review a sample of the survey questions and input the information on the references you choose. Skillsurvey will automatically send the appropriate survey to these references. Responses will be e-mailed directly to SkillSurvey, averaged together and sent to Alpha Insurance Co.'s hiring manager/administrator in the form of a report.

Please click on the link (URL) below to begin:
http://www.skillsurvey.com/eRef/email.php?CID=FXY3sm1w5fONq3q2&S=1

Questions regarding eReference can be directed to customerservice@skillsurvey.com. For more information regarding SkillSurvey, please visit www.skillsurvey.com Thank you, Alpha Insurance Co.

FIG. 9

Mark Candidate is applying for a District Manager position with Alpha Insurance Co., and has provided your name as a reference (along with at least 6 others) who has insight into his/her skills. Mark has authorized us to send you an e-survey. Your confidential survey responses will be e-mailed directly to SkillSurvey, a third-party service bureau and a leader in Web-based reference surveys.

SkillSurvey's policy is to maintain strict confidentiality of responses. Under normal circumstances, neither Alpha Insurance Co. nor Alpha Insurance Co. will see your responses because SkillSurvey averages all responses together to produce the report. We will not produce a report without responses from at least three reference providers to ensure complete confidentiality of data.

The survey is very quick and easy (about two minutes to complete). Simply click on the best numerical response for each of the 16 questions.

Alpha Insurance Co. makes selection decisions based on a number of different criteria. The reference survey information, although important, is only one of the many factors considered.

Take the survey by clicking on the link (URL) below:
http://www.skillsurvey.com/eRef/survey.2.php?QID=RYGs1

Questions regarding eReference can be directed to customerservice@skillsurvey.com. For more information regarding SkillSurvey, please visit www.skillsurvey.com Thank you for your time.

Alpha Insurance Co.

FIG. 10 eReference Report: Tim Connington
Management Position Survey
Report Date: October 23, 2003
Section One: Reference Information - Tim Connington
  Submitted to Candidate on: October 22, 2003
  References Submitted by Candidate: October 22, 2003
  Number of References: 9
  Number of Responses: 7

| Name | Email | Company/ Organization | Type Of Reference | Worked as Candidate's | Dates | Completed Survey |
|---|---|---|---|---|---|---|
| Roger Brown | rbrown@companya.com | Company A | Business | Manager/ Supervisor | 01/00 To 02/03 | ✓ 10/23/03 |
| Changes: | | | | | 02/00 To 02/03 | |
| Ryan Holcom | rohclu36@aol.com | Company A | Business | Manager/ Supervisor | 01/00 To 02/03 | ✓ 10/22/03 |
| Dick Parker | dparker@companya.com | Company A | Business | Subordinate/ Direct Reports | 06/00 To 02/03 | ✓ 10/22/03 |
| John Doen | jdoen@companya.com | Company A | Business | Subordinate/ Direct Reports | 08/00 To 02/03 | ✓ 10/22/03 |
| Changes: | | | | Peer/ Colleague | | |
| Bertha McLaughlin | bmclaughlin@companyb.com | Company B | Business | Subordinate/ Direct Reports | 10/96 To 12/99 | No |
| Stanley Keizerton | smanstan@yahoo.com | Company B | Business | Subordinate/ Direct Reports | 10/96 To 12/99 | ✓ 10/22/03 |
| Janet Kinder | jkinder@companyb.com | Company B | Business | Peer/ Colleague | 09/98 To 12/99 | No |
| Jack Brown | jbrown@companyc.com | Company C | Business | Client | 01/94 To 6/98 | ✓ 10/23/03 |
| Delia Byers | dbyers@companyc.com | Company C | Business | Subordinate/ Direct Reports | 01/94 To 06/98 | ✓ 10/23/03 |

FIG. 11A

Section Two: Survey Scores - Tim Connington

The score for each competency was calculated by averaging the numerical responses and, based on research of probable reference responses, converting the average into a "very low" to a "very high" score. The following report displays the competencies and their scores grouped into themes (similar or related skills) to give you insight into the candidate's relative strengths in key performance areas. The scores with the lowest numerical averages are indicated using bold type and asterisks. This report is followed by comments gathered anonymously from the references regarding the candidate's strengths and areas where he/she "could improve"*

- Very low or low score - Candidate seen as not having skill in this competency. If it is critical to the job, his/her ability to be successful in the job may be seriously impacted.

- Medium score - Candidate is seen as having some skill in this competency. However, he/she is seen as needing more skill or experience to be effective.

- High score - Candidate is seen as skilled in the competency but has room for improvement.

- Very High score - A "very high" score is an endorsement of perceived mastery in the competency.

FIG. 11B

| Report – [ Tim Connington ] | | | | |
|---|---|---|---|---|
| Competencies | Ratings from References | Company Comp. | Industry Comp. | Overall Rating |
| Managing the Business | | | | |
| 1. Focus resources and energy on activities that will achieve the greatest results | Medium * | High | Medium | Medium |
| 2. Show resourcefulness in getting results under new or undefined business conditions | High * | Medium | Low | Medium |
| 3. Continue to pursue goals despite problems and setbacks by demonstrating confidence, persistence and a sense of urgency | Medium | Medium | Medium | Medium |
| Managing the Business Average: | High | Medium | Medium | Medium |
| | | | | |
| Managing People | | | | |
| 4. Seek commitment rather than passive acceptance to goals and priorities in working with others | High | High | Medium | High |
| 5. Work with others to establish clear and realistic roles, responsibilities and goals as well as effective plans to reach goals | High | High | Medium | High |
| 6. Value and accommodate diversity | High | High | High | High |
| 7. Listen intently to fully understand the needs and perspectives of others | Medium * | High | Medium | Medium |
| 8. Demonstrate a genuine commitment to helping other people improve their effectiveness and succeed (e.g. by fully sharing information, expertise and resources), rather than always serving his/her own needs | Medium | Medium | Medium | Medium |
| 9. Give helpful and constructive (rather than negative or punishing) feedback on the performance of others | High * | High | Medium | High |
| 10. Recognize and praise others' efforts and accomplishments | Medium | Medium | Medium | Medium |
| Managing People Average: | High | High | Medium | High |
| | | | | |
| Teamwork | | | | |
| 11. Focus on getting results for the business rather than on "turf" issues | Medium | High | Medium | Medium |
| 12. Work to build strong networks with peer level managers, boss and all support areas | High * | High | Medium | High |
| 13. Encourage team members to develop strong positive relationships with each other | Medium * | High | Medium | Medium |
| Teamwork Average: | Medium | High | Medium | Medium |
| | | | | |
| Leadership | | | | |
| 14. Show support for the organization, its values and its goals | High | High | Medium | High |
| 15. Take personal responsibility for his/her actions and results, without blaming others or making excuses | Medium | Medium | Medium | Medium |
| 16. Demonstrate high standards of personal integrity and credibility | High | High | Medium | High |
| Leadership Average: | High | High | Medium | High |
| | | | | |
| Overall Average: | High | High | Medium | Medium |

FIG. 11C

Comments on Tim Connington's "Strengths" and "Could Improve" areas

Strengths:
- "Achieving success quickly in new challenges."
- "Compassion, focus, caring, goal-oriented, strives to get the best out of each person, so they can reach their maximum potential."
- "Excellent business person. Honest and caring. Does what is promised. Very professional in all dealings. Has great respect in the community in civic and business matters."
- "Tim is the finest Manager I have ever had the privilege of working with. His strongest skill is the ability to bring a team together with a sense of cause and resolve."
- "Tim gets his strength from his ability to divide long term goals into achievable shorter term goals thus inspiring enthusiasm in team members."
- "Tim has the proven ability to consistently develop very successful business units."
- "Tim is the best manager I have ever met. I've been in business 20 plus years and I have counted on him not only to give me information on insurance, but to give me advice on managing. He is extremely good, especially in difficult situations."
- "Tim is very adept at helping producers recognize their natural markets, then assisting them with a marketing and goal setting plan."
- "Tim understands the market and the overall business we are in. He has great passion for what he does & is committed to achieving success at all cost. He is a very good General Sales Manager and is well respected by his peers in this business."

Could Improve:
- "Getting involved in issues with co-workers that are outside of business...trying to help people at work in problems that are not business related."
- "If I had to give one criticism of Tim, it would be that he gives people one more chance than I would. He so believes in his people, I think he takes it personally when they don't succeed."
- "In his ability to understand and accept that not everyone can work at his skill level."
- "Self confidence"
- "Should take more vacations. Works a great deal helping others."
- "Tim has so many strengths that they mask his weaknesses well. Tim could probably improve his ability to listen to others and make others feel their ideas have merit."
- "Tim is generous almost to a fault in personal relationships and should look to his own needs a little more."
- "Tim is such a strong agent advocate that, on occasion, he will persist with "minutia" in order to prove that his position was on target"

FIG. 11D

Behavioral Interview Questions

These questions focus on the candidate's lower scoring competencies (those where the numerical averages where lowest). Use them during future interviews to find out more about the candidate's skills, abilities and experience in these competencies. Click here to find out more about behavioral interviewing techniques.

Question 1. Focus resources and energy on activities that will achieve the greatest results.

Probing Questions:

Ask: Talk about a time when you had to work with limited resources. How did you maximize the effectiveness of the resources you had? How did you know what activities would get you the "biggest bang for the buck"?

Look for: Ability to look at the big picture, to set priorities accordingly, and to let that perspective drive allocation of resources. Ability to resist distraction when there are multiple tasks at hand.

---

Question 2. Show resourcefulness in getting results under new or undefined business conditions.

Probing Questions:

Ask: How have you successfully managed situations where conditions or expectations were ambiguous, ill-defined, or otherwise difficult to perceive - whether it was because you were new to the situation, or because no one else knew what was going on either? How did you get the information you needed to proceed? What was most difficult about that kind of situation, and how specifically did you cope with it?

Look for: Resourcefulness in dealing with ambiguity or lack of definition. Adaptability and flexibility in the face of uncertainty. Self-confidence in one's abilities, combined with a willingness to learn.

---

Question 7. Listen intently to fully understand the needs and perspectives of others.

Probing Questions:

Observe during interview: How well does the candidate listen to you? Does he/she consider what you are saying? Does he/she use body language, including eye contact, body position, etc. in a way that indicates engagement in the conversation?

Look for: Ability to focus attention on someone who is speaking to them. Ability to summarize another's point of view, and reflect it back. Willingness to yield "air time" to another.

---

Question 9. Give helpful and constructive (rather than negative or punishing) feedback on the performance of others.

Probing Questions:

Ask: Describe a time when you helped a staff member or co-worker turn unsatisfactory or problem performance around, or brought to their attention a problem with the way they worked. How did you approach them, how did you address the problem, and how did the employee respond in terms of behavioral change?

FIG. 12A

Look for: Willingness to address performance issues head-on and in a timely manner. Ability to address others' shortcomings in a positive way, and encourage positive change. Understanding that when employees perceive they are being "criticized," it usually lowers their motivation and future performance, and weakens the relationship with the person giving the feedback.

---

Question 12. Work to build strong networks with peer level managers, boss, and all support areas.

Probing Questions:

Ask: How have you utilized your relationships with peers and colleagues in the company to further your area's goals? Tell me about a time when you were able to leverage the networks that you had built within your company to accomplish a particular task. What went into establishing those networks in the first place? What specifically did you do?

Look for: Ability to maintain and leverage peer-level relationships. Appreciation of the importance of establishing and maintaining internal networks. Understanding that this maintenance relies on: expectations that are clear to all parties; mutual commitment to common goals; constant attention to ensuring that the other person's needs are being met; and lots of ongoing communication and follow-through to maintain trust.

---

Question 13. Encourage team members to develop strong positive relationships with each other.

Probing Questions:

Ask: What have you done to bring your team members into closer and more effective relationships? What challenges have you had to overcome to make your team members work together smoothly?

Look for: Awareness of, and ability to deal with, interpersonal relationships within teams, while not getting distracted from business goals by "soap operas." Understanding that strong, successful teams that are characterized by trust and cooperation rather than conflict and jealousy get consistently superior business results. Realization that fostering competition between team members, while sometimes attractive to a manager, has many downsides, and competition can degenerate into backstabbing and conflict.

Coaching Tactics

Question 1. Focus resources and energy on activities that will achieve the greatest results.

Coaching Tactics
Coach the new manager to do the following:

- To ensure that all decisions, plans and activities are on target and will achieve the greatest results, first define the outcome you are working towards - the results you will get by completing the task or dealing with a problem.
- When fixing problems or working on tasks, always ask yourself and your staff: "What is the outcome expected from this?"
- Keep larger, longer-term business outcomes (e.g., better service, cost control) in mind as "touchstones" for all your activities.
- Be sure that your short-term outcomes support longer-term directions. When you define short-term outcomes, ask: "What larger outcome is this supporting and actively moving me towards the accomplishment of?" If the answer isn't clear, you may need to reassess what you are doing.

---

Question 2. Show resourcefulness in getting results under new or undefined business conditions.

Coaching Tactics
Coach the new manager to do the following:

- Understand that change and uncertainty are becoming more and more the norm in today's business environment.
- Focus on the positive aspects of new or poorly defined situations - the potential for growth and development, the opportunity to help shape the new conditions, etc.
- Analyze what one does know about the situation, identify the knowledge or skills that are yet needed, and locate the sources of such knowledge/skills.
- Include staff as active participants in the discussions on change, particularly on how to prepare. If they feel that they are prepared, they will embrace change more readily.
- Be proactive in getting advice or perspectives from others; sometimes others can provide information or insights that one cannot see for oneself.

---

Question 7. Listen intently to fully understand the needs and perspectives of others.

Coaching Tactics

- The best coaching in communications skills is to teach by example. Listen to others; don't just provide information or responses. Give the other party "air time." Show that you're interested. Summarize, clarify or empathize as appropriate. Maintain eye contact and speak slowly and naturally. Put warmth in your voice.
- After an interaction that you have both witnessed or participated in, point out to the new manager/supervisor examples of others listening well or poorly.
- Help the new manager become more sensitive and perceptive about body language and facial expressions, and how to read what others are "saying behind their words." It is easy to be misinterpreted regarding this practice, but it is also easy to correct misperceptions with a little feedback and coaching.

Question 9. Give helpful and constructive (rather than negative or punishing) feedback on the performance of others.

Coaching Tactics
For feedback to be helpful, it needs to be clear and have the staff member's buy-in. If it is perceived as unhelpful, it is less likely the staff member will act on the feedback and more likely he/she will try to avoid getting feedback in the future. To make feedback feel helpful, a manager should:

- Start any discussion by stating a helpful outcome - e.g., "I want to give you some feedback on your approach so you can continue to improve and become the best sales person we have." An outcome the person can buy into will make them want to listen carefully to the feedback.
- Focus the feedback on future results, rather than critiquing the past. Even though it is their recent performance that is prompting the feedback, it gives it a better context to phrase it in the future -- e.g., "The next time you approach a similar situation, you should..." This avoids "you did this"/"no I didn't" discussions.
- Make sure staff members can take specific actions in response to the advice. Timing is important. The best time to have the discussion is just before they are going to engage in the same situation or task again. However, it should be delivered in a timely fashion, not dumped on the staff member a year later.
- Give positive feedback too! Managers see their job as "correcting" wrong performance. So, given the time constraints of a busy job, they tend to give corrective feedback. But constant corrective feedback can be seen as "attacking," and most people either shut down and not listen or get angry when attacked.
- Make sure that feedback is based on criteria that are clear, well-understood, and previously agreed-on. Getting agreement on the criteria for measurement during feedback will not work!

---

Question 12. Work to build strong networks with peer level managers, boss, and all support areas.

Coaching Tactics
Coach the new manager to do the following:

- Focus on shared outcomes. Have regular discussions with one's partner(s) on the issues or pressures in his/her business so you know what is important to him/her. Do not start discussions by focusing on where you disagree, problems you are having, or what you want from your partner, but by focusing on outcomes - what you both are trying to achieve by working together on an issue. Emphasize how that connects with your customer's needs:
- Don't come into discussions with partners with a predetermined idea of what would be the best answer, but allow answers to come out of mutual discussion.
- Be proactive in finding out what one's partners need.
- Be clear and specific in laying out mutual expectations with partners.
- See your partners as a part of your business "family." Once you have established shared outcomes, actively look for ways to support your partners. Part of your job is spending time helping your valuable partners. It will help you achieve your results.
- Care about what your partner is saying rather than just waiting for your turn to speak. Listening and responding sends the message that you are engaged in a dialogue, not a debate. In discussions, validate your partner's input, let him/her know he/she has a good point and add to its content, as opposed to always finding the "flaw" in what he/she said.

---

Question 13. Encourage team members to develop strong positive relationships with each other.

Coaching Tactics

FIG. 13B

- If the manager makes the decisions for the team (work group), calls all the meetings, does all the coaching and mentoring, and gives the support needed, then the team has no reason to work with each other. Given the time constraints on a manager and the need for synergy to stretch limited resources, having staff members work as a team is necessary. Therefore, it is important for a manager to step away from filling pivotal roles for every direct report. To do this, the new manager should be encouraged to:
- Set the expectation with the team that everyone will share the responsibility for the performance of the team and will work to support each other.
- Occasionally delegate the role as leader and mentor to others on the team - choosing staff members that can handle meetings or work with another staff member as a resource on a task, and asking them to step in.
- Ensure that the team discusses and develops some common goals. Sharing common goals that everyone cares about and wants to meet is often the most powerful "glue" that a team can have.
- The manager should set the expectation that sharing is a positive behavior and a part of the job, and be specific with examples that would result in better performance.
- Encourage the new manager to reward sharing behavior when he/she sees it. Even a simple "Good job, you worked well together on this" can be powerful.
- Look for team rewards. It can be hard on teamwork if every reward is for individual contribution. Add team rewards even if they are not monetary. Find something that works within one's situation - e.g., dress-down days, shared pastries, or rotating "late days" where they cover for each other. Ask the team what they would like to make sure it is valued.
- The new manager should be sure to have regular team-building activities, and make sure that meetings are held only when needed. Always have "strengthening the team" or "making the team more effective" as one of the topics.

FIG. 13C

| Report – [ Candidate Comparison ] Job Description – [ Project Manager ] | | | |
|---|---|---|---|
| Competencies | Candidate #1 | Candidate #2 | Candidate #3 |
| OVERALL SUMMARY | High | High | Medium |
| Managing the Business | | | |
| 1. Focus resources and energy on activities that will achieve the greatest results | Medium * | High | Medium |
| 2. Show resourcefulness in getting results under new or undefined business conditions | High | Medium * | Low * |
| 3. Continue to pursue goals despite problems and setbacks by demonstrating confidence, persistence and a sense of urgency | Medium * | Medium * | Medium * |
| Managing the Business Average: | High | Medium | Medium |
| Managing People | | | |
| 4. Seek commitment rather than passive acceptance to goals and priorities in working with others | High | High | Medium * |
| 5. Work with others to establish clear and realistic roles, responsibilities and goals as well as effective plans to reach goals | High | High | Medium |
| 6. Value and accommodate diversity | High | High | High |
| 7. Listen intently to fully understand the needs and perspectives of others | Medium * | High | Medium |
| 8. Demonstrate a genuine commitment to helping other people improve their effectiveness and succeed (e.g. by fully sharing information, expertise and resources), rather than always serving his/her own needs | Medium | Medium * | Medium |
| 9. Give helpful and constructive (rather than negative or punishing) feedback on the performance of others | High | High | Medium |
| 10. Recognize and praise others' efforts and accomplishments | Medium | Medium * | Medium |
| Managing People Average: | High | High | Medium |
| Teamwork | | | |
| 11. Focus on getting results for the business rather than on "turf" issues | Medium * | High | Medium |
| 12. Work to build strong networks with peer level managers, boss and all support areas | High | High | Medium |
| 13. Encourage team members to develop strong positive relationships with each other | Medium | High | Medium |
| Teamwork Average: | Medium | High | Medium |
| Leadership | | | |
| 14. Show support for the organization, its values and its goals | High | High | Medium |
| 15. Take personal responsibility for his/her actions and results, without blaming others or making excuses | Medium * | Medium * | Medium * |
| 16. Demonstrate high standards of personal integrity and credibility | High | High | Medium * |
| Leadership Average: | High | High | Medium |

* is the first 1/3 of lowest scores

FIG. 14 eReference Vendor Report

Report

Competencies Ratings
From References

Establishing Effective Business Relationships

1. Works to achieve a thorough understanding of the client's organization and business (strategy, structure, products/services, etc.)
   Medium 2. Does a thorough fact-find up front to determine client's situation, needs, and requirements.
   Low *

3. Establishes a clear understanding and mutual expectations with the client about how to work together effectively (roles, responsibilities, timing, deliverables, etc.).
   Medium 4. Uses the client's language, not their own jargon.
   Medium 5. Handles client questions, concerns, and objections in a positive and helpful way without bypassing or glossing over concerns.
   Medium 6. Clearly explains the features, benefits, and advantages of their products and services, specifically relating them to client needs.
   High 7. Clearly, truthfully, and fully explains the pricing and relevant terms and conditions pertaining to the purchase and use of the vendors products/services.
   Medium 8. Recommends the best solution for the client company based on client needs.
   Medium 9. Keeps bureaucracy, red tape and other inefficient time-wasters to a minimum in contracts, billing and all other dealings with client company.
   Medium 10. Puts top-notch people on client account – knowledgeable, effective, responsive, courteous and supportive, etc.
    Low

Establishing Effective Business Relationships Average: Medium

Delivering the Promise

11. Responds to the client's need for information, clarity or decisions in a timely and effective way, demonstrating a sense of urgency and commitment to help.
    High

FIG. 15A

12.
Operates in an open, honest and ethical manner at all times with the client company.
Medium 13.
Gives the client sufficient assistance in terms of resources, time, expertise, knowledge, etc. to fully serve client's needs and solve their problems.
Low 14.
Keeps client updated and "in the loop" on status of deliverables, requests, questions, and work being done (when, how, and by whom).
High 15.
Does "whatever it takes" to ensure that the client is delighted with the vendor's products and services at all times
Medium 16.
Fully delivers on all commitments made to client — quality of product /service, price, timing, etc.
Medium

Delivering the Promise Average: Medium

Maintaining & Strengthening the Relationship

17.
Is flexible in adapting to changes required by the client.
Low *

18.
Makes a quick recovery when mistakes are made.
High

19.
Makes it easy for clients to communicate with the right person/department to address problems or questions.
High 20.
Accepts full responsibility for all actions and results, dealing with feedback or criticism in a positive, non-defensive and non-confrontational way.
Medium

Maintaining & Strengthening the Relationships Average: Medium

Overall Average: Medium

FIG. 15B

| Report – [ 360 Survey Success Report] | | |
|---|---|---|
| Competencies | Raw Score | Rating |
| Managing the Business | | |
| 3. Continue to pursue goals despite problems and setbacks by demonstrating confidence, persistence and a sense of urgency | 4.7 | Very High |
| 2. Show resourcefulness in getting results under new or undefined business conditions | 3.0 | Medium |
| 1. Focus resources and energy on activities that will achieve the greatest results | 2.5 | Medium |
| Managing the Business Average: | 3.40 | Medium |
| | | |
| Managing People | | |
| 8. Demonstrate a genuine commitment to helping other people improve their effectiveness and succeed (e.g. by fully sharing information, expertise and resources), rather than always serving his/her own needs | 4.9 | Very High |
| 4. Seek commitment rather than passive acceptance to goals and priorities in working with others | 4.7 | Very High |
| 5. Work with others to establish clear and realistic roles, responsibilities and goals as well as effective plans to reach goals | 4.5 | Very High |
| 9. Give helpful and constructive (rather than negative or punishing) feedback on the performance of others | 4.3 | High |
| 6. Value and accommodate diversity | 4.2 | High |
| 10. Recognize and praise others' efforts and accomplishments | 4.1 | High |
| 7. Listen intently to fully understand the needs and perspectives of others | 4.0 | High |
| Managing People Average: | 4.38 | High |
| | | |
| Teamwork | | |
| 11. Focus on getting results for the business rather than on "turf" issues | 4.8 | Very High |
| 13. Encourage team members to develop strong positive relationships with each other | 4.7 | Very High |
| 12. Work to build strong networks with peer level managers, boss and all support areas | 4.5 | Very High |
| Teamwork Average: | 4.66 | Very High |
| | | |
| Leadership | | |
| 16. Demonstrate high standards of personal integrity and credibility | 5.0 | Very High |
| 14. Show support for the organization, its values and its goals | 4.8 | Very High |
| 15. Take personal responsibility for his/her actions and results, without blaming others or making excuses | 4.6 | Very High |
| Leadership Average: | 4.8 | Very High |
| | | |
| Overall Average: | 4.31 | High |

FIG. 16

US 8,721,340 B2

SYSTEM AND METHOD FOR EVALUATING JOB CANDIDATES

CROSS REFERENCE TO RELATED APPLICATIONS

This application is a continuation of U.S. application Ser. No. 10/912,433 which claims priority to U.S. provisional patent application No. 60/492,457, filed Aug. 4, 2003, which are incorporated herein by reference.

FIELD OF THE INVENTION

This invention relates to human resource management system, and more particularly to a system for collecting and analyzing information from references identified by job candidates.

BACKGROUND OF THE INVENTION

It has been estimated that errors in hiring cost companies more than 50 billion dollars per year in lost revenue, decreased productivity, squandered training expenses, legal liabilities, high turnover and other undesirable consequences. The result, in spite of the dramatic increase in the use of background checks and psychological profiles by many organizations, and the universality of selection interviews, is that annual turnover in U.S. companies of over 5,000 employees continues to be 25%. According to experts in the field, nearly 80% of turnover is caused by poor selection decisions.

Therefore, background checks have become even more important than in the past. One part of the background check, and more generally the hiring process, is the gathering of information from references, that is those individuals identified by a job candidate as being knowledgeable about the candidate's character and qualifications.

Unfortunately, traditional reference checking methods such as telephone interviews are very costly and time-consuming, require extensive training for interviewers and generally do not yield useful information due to lack of precision, lack of confidentiality and possible errors of filtering, amplification and interpretations by the intermediaries. Most important, perhaps, is the fact that in today's litigious society, business and professional reference givers are usually unwilling to provide more than basic information such as employment dates and positions held. Such information has little value in helping companies make effective hiring decisions.

Another problem with the conventional reference checking is that it's done very late in the hiring process, which is typically done after the candidate is hired. Ideally, it should be done during the screening and selection process. Moreover, the conventional background checking provides no guidance for the hiring manager to further explore areas of weakness in the candidate during the hiring process.

Therefore, it would be desirable to provide a more effective and inexpensive system and method for collecting and evaluating information provided by reference providers for job candidates. It would be also desirable to provide such a system that is substantially automated and that is used early in the hiring process.

SUMMARY OF THE DISCLOSURE

A system for collecting and analyzing survey data from reference providers identified by a job candidate for use by an employer is provided. The system includes a candidate database that stores survey data which are provided by the reference providers. A collection module running in the system sends an electronic communication to the reference providers requesting them to complete the survey questions and electronically receives the survey data. The electronic communication preferably contains a URL link that takes the reference provider to a dynamically generated webpage through which the survey data are entered.

An analysis module running in the system combines the received survey data from the reference providers and generates a candidate report. In one aspect, the candidate report is a confidential report which excludes identification of any ratings or comments by any reference providers. In another aspect, the system also generates customized interview probe questions for use during job interviews and coaching tactics for use after the hiring, based on the weak areas that have been identified from the completed surveys in order to assist the hiring manager to bring the new hires up to speed quickly and effectively.

The human resource system provides substantially automated collection and analysis which is inexpensive and yet accurate and useful.

BRIEF DESCRIPTION OF THE DRAWINGS

FIGS. 8A and 8B illustrate a sample survey form.

FIG. 9 is a sample email sent to a job candidate.

FIG. 10 is a sample email sent to each reference identified by the job candidate.

FIGS. 11A-11D illustrate a sample candidate report for use by a hiring manager.

FIGS. 12A-12B illustrate a sample set of interview questions for use by the hiring manager in a subsequent interview with the job candidate.

FIGS. 13A-13C illustrate a sample set of coaching tactics for use by the hiring manager after the job candidate is hired.

FIG. 14 illustrates a group report which ranks multiple job candidates.

FIGS. 15A and 15B illustrate a sample vendor report that evaluates vendors supplying goods and services to a company.

FIG. 16 illustrates a sample report that shows the correlation between survey questions/competencies and performance of hired candidates.

DETAILED DESCRIPTION OF THE INVENTION

As an overview, the present invention uses a computer network such as the Internet and the resources of the network including emails and webpages to set up initial survey questions, send out emails to references identified by job candidates, collect confidential competency-based survey information via webpages from the identified references, analyze the collected information and generate candidate reports for use by a hiring manager. The system has integrated the screening and selection process with a competency based survey database that allows the comparative review of reference information against one or more candidates, the company's own employees, the industry or other normalized database by job type, organization or company competency.

Figure 1:
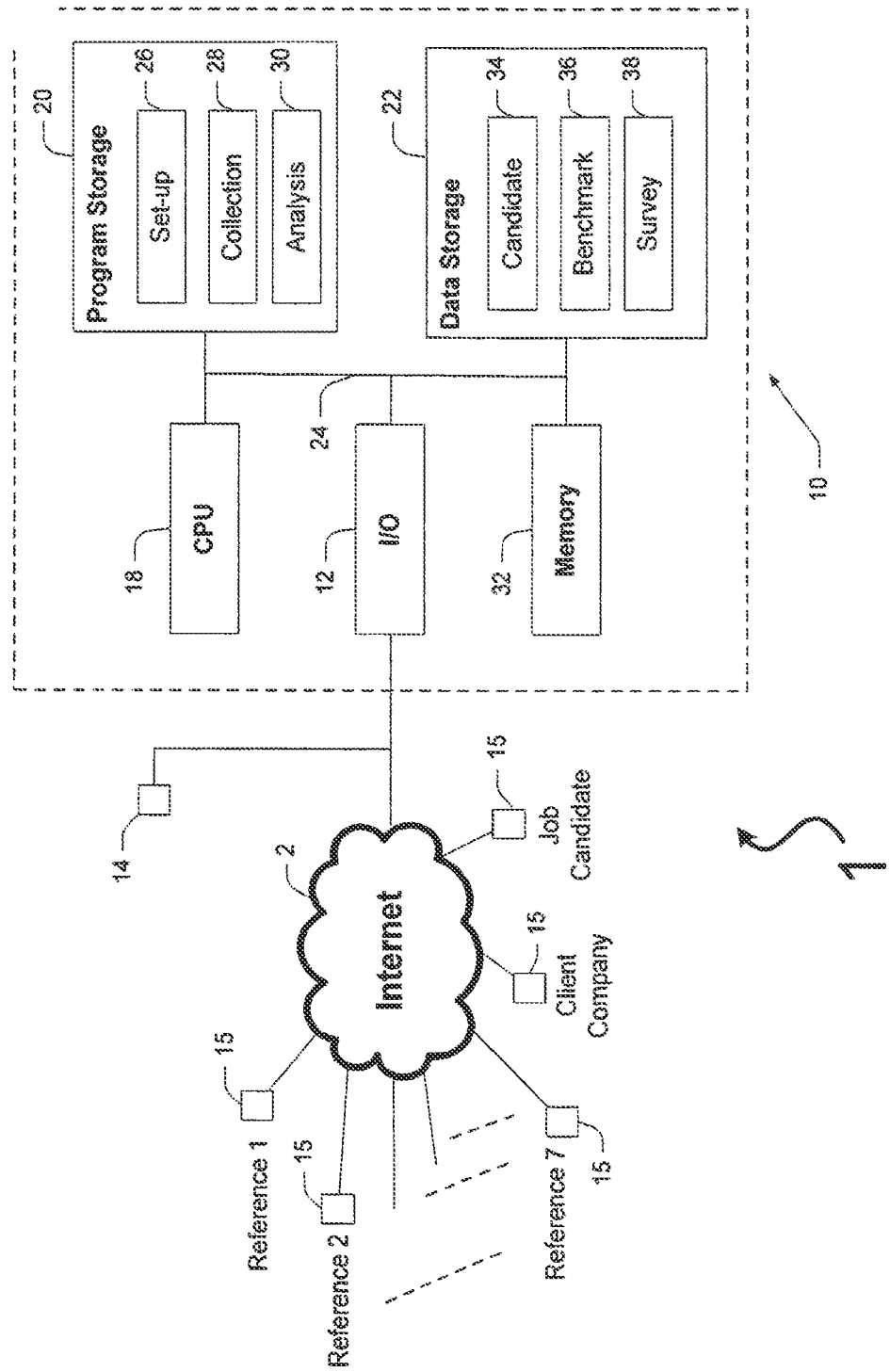
FIG. 1 is a block diagram of a job candidate evaluation system according to the present invention.

Referring now to FIG. 1, a job candidate evaluation system 1 of the present invention involves a number of computers 10, 15 that are connected to each other through a computer network such as the Internet. The computers 10, 15 of the system 1 cooperate with each other to provide comprehensive collection and analysis of reference information that are made through the network 2. Computers 15 are similar to the computer 10, with the exception of some of the databases and software modules.

As illustrated in FIG. 1, the computer 10 is connected to the Internet 2 through, for example, an 110 interface 12, such as for a LAN, WAN, or fiber optic, wireless or cable link, which receives information from and sends information to other computers 15. The computer 10 is also connected to a keyboard 14 for controlling the computer.

The computer 10 includes, for example, memory storage 16, processor (CPU) 18, program storage 20, and data storage 22, all commonly connected to each other through a bus 24. The program storage 20 stores, among others, software programs such as set-up module 26, collection module 28, and analysis module 30 as will be explained in detail later herein. The data storage 22 stores, among others, candidate database 34, benchmark database 36 and survey database 318, all preferably stored in a relational database that relates all of the databases stored in the data storage. Any of the software program modules in the program storage 20 and data from the data storage 22 are transferred to the memory 32 as needed and is executed by the processor 18.

The computer 10 can be any computer such as a WINDOWS-based or UNIX-based personal computer, server, workstation or a mainframe, or a combination thereof. While the computer 10 is illustrated as a single computer unit for purposes of clarity, persons of ordinary skill in the art will appreciate that the system may comprise a group of computers which can be scaled depending on the processing load and database size and which can be remotely located to provide localized non-stop service.

Figure 2:
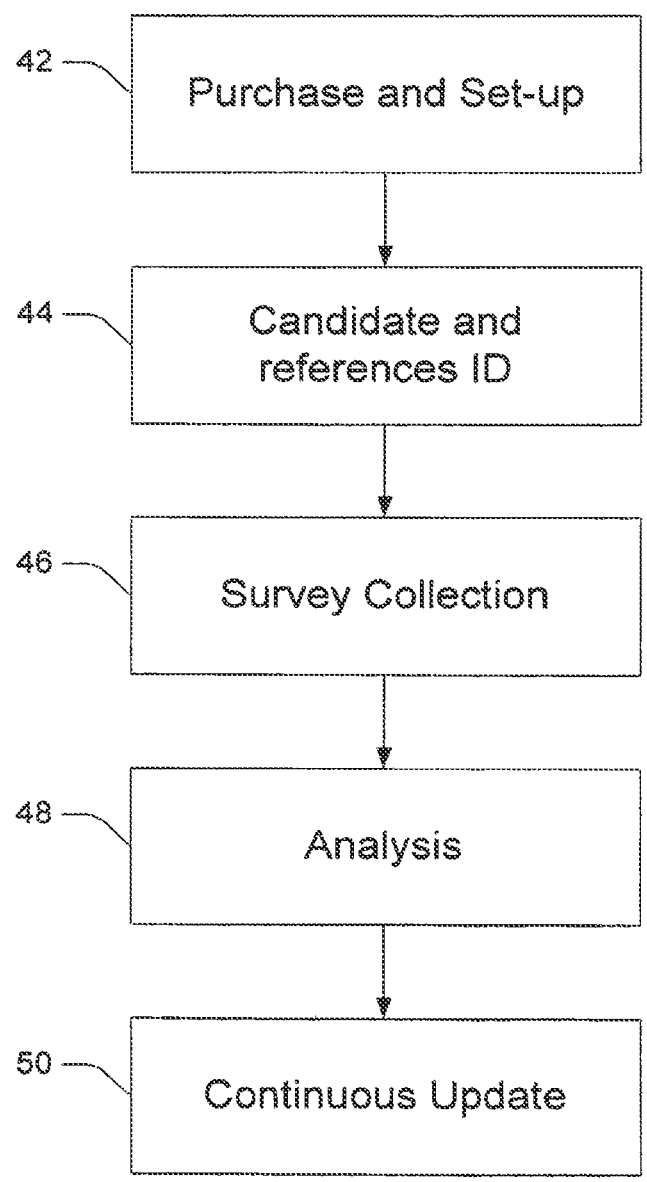
FIG. 2 is a simplified process flow of a candidate evaluation process according to the present invention.

FIG. 2 illustrates a high level process flow of the evaluation process according to the present invention. In step 42, a client company sets up an order for a job candidate or multiple candidates, and prepares one or more surveys for use in the hiring process as will be explained in detail with reference to FIG. 3. This step is executed by the set-up module 26. In the same step, the order for the job candidates is done by purchasing a certain number of candidate reports and specifying the purchase information. Purchase of one report provides unlimited generation of reports for each job candidate until the time of hire or rejection.

In step 44, the hiring manager identifies a job candidate and receives information about the references or reference providers that are identified by the job candidate, which include an email address for each reference as will be explained in more detail with reference to FIG. 4. A reference provider should be someone who has worked extensively with the job candidate in the past which include customers, supervisors, and peers. Step 44 is executed by the collection module 28.

In step 46, which is also executed by the collection module 28, the system 1 sends emails to all of the references that were identified by the job candidate. The email requests each reference to fill out the survey prepared by the hiring manager. The survey information is then collected from the identified references through web pages and stored in the survey database 38. Step 46 is more fully explained with reference to FIG. 5.

In step 48, executed by the analysis module 30, the system 1 analyzes the collected information and generates a report that includes the overall assessment of the candidate's competency in each of the several competency areas and includes any comments supplied by the references. Competency is a well known concept that represents a particular characteristic of an individual or organization performing a task, function or project at a particular point in time that leads to successful performance. The report can be a final report with all surveys completed by the references, or it can be a real time interim report with analysis of partially completed survey information which can be requested by the hiring manager at any time. Based on the analysis, the system 1 also generates "interview probes" for those areas where the candidate did not score as highly as others, a sample of which is shown in FIGS. 12A-12B. The probes guide an interviewer to obtain more information about the candidate's level of accomplishments or experience with regard to specific lower scoring competencies. The report may also include coaching tactics to manage and develop the candidate assuming the candidate is hired, a sample of which is shown in FIGS. 13A-13C. Like the interview probes, the coaching tactics are also based on analysis of those areas where the candidate did not score as highly as others. The coaching tactics are suggested "micro-behaviors" that the hiring manager can use to help the candidate to develop his strengths in lower-scoring competencies. Step 48 is more fully explained with reference to FIG. 6.

In step 50, the system 1 continuously monitors the job candidates after the hiring process. The system tracks the progress of the hired candidates and collects additional data such as performance levels of the hired candidates. The additional data for all the candidates are then analyzed to generate additional reports containing the correlation between various competencies and high retention/performance. The reports are preferably graphical in nature and graphically illustrate the competencies that are most closely correlated with the high retention/performance of the candidates. The reports can also be customized by a user to specify whether the correlation is based on position-specific, company-wide or industry-wide benchmarks as will be explained in detail with reference to FIG. 7.

Figure 3:
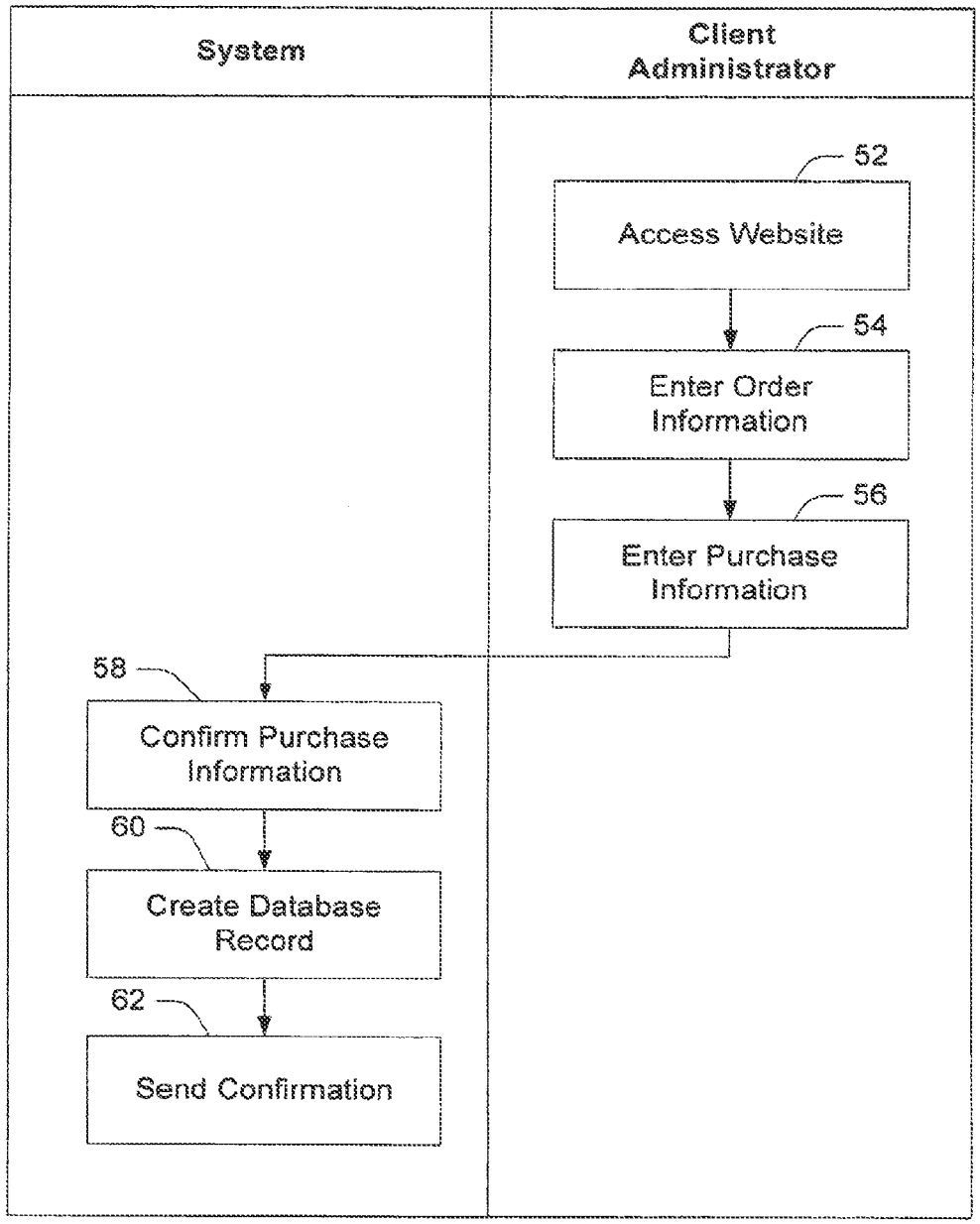
FIG. 3 illustrates a detailed process flow of a purchase and set-up step of FIG. 2.

FIG. 3 illustrates a detailed process flow of the purchase and set-up step 42 of FIG. 2.

In step 52, a client company uses an Internet enabled computer 15 to access web pages of the system 1 through the Internet 2. The web pages are generated by a conventional database web page generating engine such as PHP (Hypertext Preprocessor) in conjunction with a relational database program stored in the program storage 20 and the web engine is executed by the processor 18. The Internet enabled computer 15 is equipped with a web browser capable of handling forms.

In step 54, order information such as the client company's address and contact information of various hiring managers working for the client company are filled out in the web page form that was generated by the computer 10. In step 56, purchase information such as the number of reports purchased and credit card data are also entered through the web page. The data entered by the client company are stored in the data storage 22. In step 58, the credit card information provided by the client company is verified and in step 60 a client record is created in a client database in the storage 22 with the contact and purchase information. The client record includes an allocation of reports to specific hiring managers and the user id and password for each hiring manager. In step 62, the computer 10 generates a confirmation message confirming the number of reports purchased and the set-up of the client company in the system 1.

As can be appreciated by persons of ordinary skill in the art, the above steps 52-62 are optional and can be omitted by using a billing arrangement where the client company is billed on a periodic basis for the candidate evaluation services that have been rendered.

Figure 4:
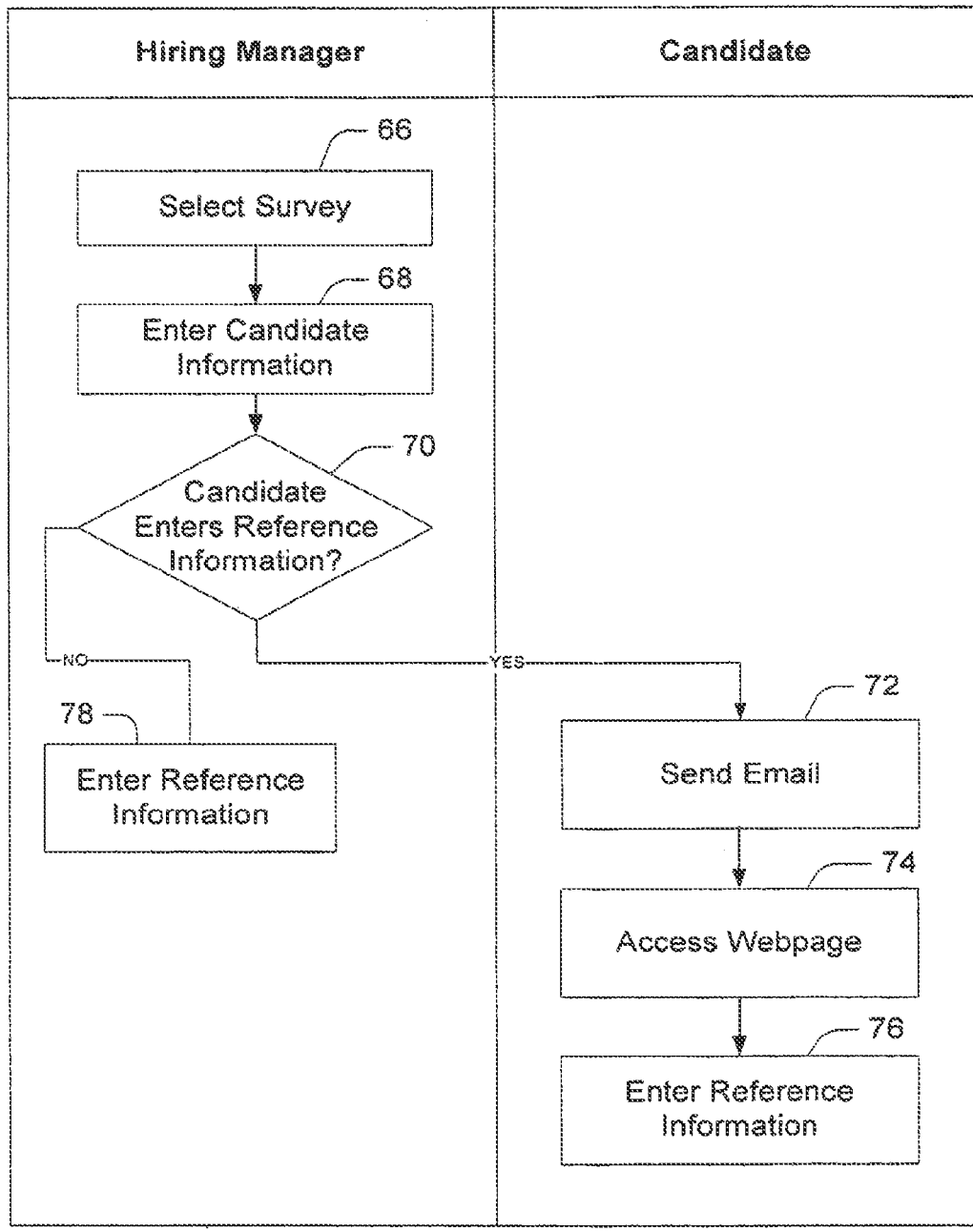
FIG. 4 illustrates a detailed process flow of a candidate and reference identification step of FIG. 2.

FIG. 4 illustrates a detailed process flow of the candidate and reference identification step 44 of FIG. 2. When a hiring manager needs to fill a particular position, the manager accesses the computer 10 through a web browser. In step 66, the hiring manager designates a survey that is to be used for that position. The manager can choose from a set of pre-designed or pre-selected surveys stored in the data storage 22, design his own by selecting survey questions from an existing set of questions stored in the data storage, create his own set of questions, or modify an existing survey. The questions are stored in a master table in data storage 22. Each survey also has a corresponding record in the database, which points to the questions in the master table that are included for that survey. Each survey question relates to a specific job-related and validated competency, selected from a bank of competencies that have been derived, tested and validated from experience and research.

FIGS. 8A-8B illustrate a sample survey that is used for a management position. The survey of FIG. 8A contains 16 questions that relate to various competencies that are known to be important for a management position. For example, the first three questions relate to a competency known as "Managing the Business". Each of the 16 questions requires the reference to select a value of "1" through "7" by clicking on an appropriate radio button. The survey also contains two comment boxes as shown in FIG. 8B. It includes one for describing the candidate's strengths and one for describing the candidate's weaknesses.

Once a particular survey is selected or created, the hiring manager enters the job candidates' information in step 68 through the computer 15 and sets the required minimum number of references that must be provided by each job candidate. The entered information is stored by the computer 10 in the candidate database 34 of the data storage 22. In step 68, the computer 10 also generates a unique 16 character alphanumeric identifier for that job candidate which is also stored in the candidate database 34. The alphanumeric identifiers are used for security purposes since they ensure that only known and authorized job candidates can enter or access the information in the system 1.

In step 70, the computer dynamically generates a web page asking whether the reference information will be provided by the job candidate. If the hiring manager answers yes, the computer 10 in step 72 generates and send an email message to the job candidate with a URL link to a dynamically generated web page and requesting the job candidate to click on the link to provide information on the references he chooses. A sample email to a job candidate is shown in FIG. 9.

In step 74, the job candidate receives the email and accesses the web page generated by the computer 10 by clicking on the link provided in the email. In response, the computer transmits through the Internet 2 a sample of the survey questions for display on the candidate's computer 15 along with a dynamically generated web page form to provide information on the references. The sample survey questions assist the candidate in determining which individuals would be appropriate references. In step 76, the job candidate enters via the web page form the names, email addresses and relationship of the references. The relationship field only allows "Business" or "Professional" as "Personal" references tend to give scores that are severely skewed towards the positive, and may not have specific knowledge about the job-related competencies of the candidate. The candidate also indicates the dates and location of the relevant employment. The candidate then submits the form to the computer 10.

The collection module 28 of the system 10 then verifies that each email address is in a valid format and that there are no duplications. As part of the validity check, the collection module 28 checks the domain portion of each email address against the registered location using industry standard databases (WHOIS) to provide the hiring manager additional information if needed. Once the candidate is determined to have submitted a valid list, the computer 10 stores the data on references in the candidate database 34.

If the answer to step 70 is no, however, then the hiring manager already has the information of references. That information is entered by the hiring manager in step 78. The same type of data checking that are performed in step 76 is also performed in step 78 to ensure that no errors are made.

Figure 5:
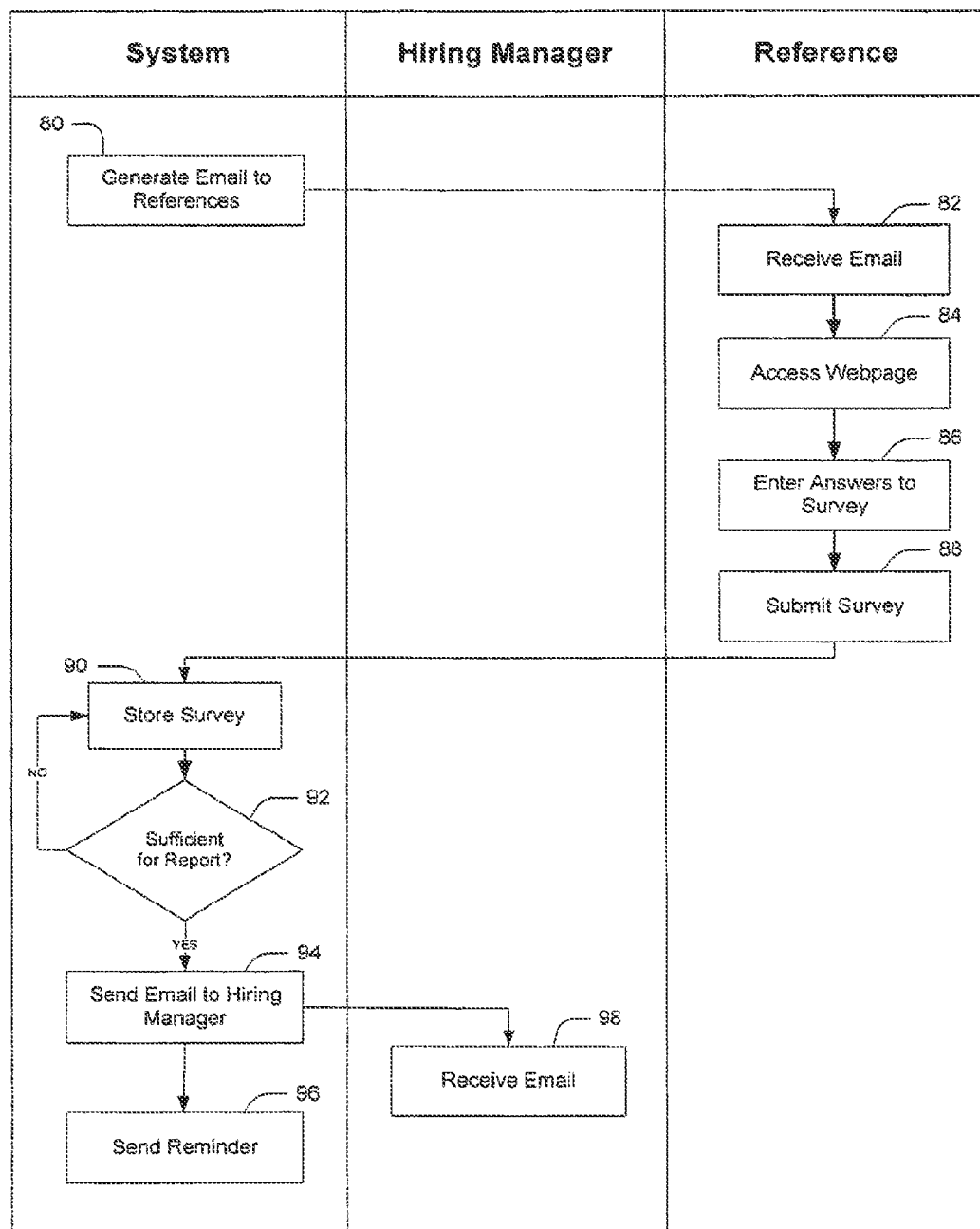
FIG. 5 illustrates a detailed process flow of a collection step of FIG. 2.

FIG. 5 illustrates a detailed process flow of the collection step of FIG. 2. In step 80, the computer 10 generates a unique identifier for each reference and send an email message to each reference explaining the purpose of the email and directing the reference to click on a URL link to a dynamically generated web page. The unique identifier is generally used internally to uniquely identify the reference within the system 1. A sample email to each reference is shown in FIG. 10. The sample email contains a statement that the operator of the system 1 will maintain strict confidentiality of responses provided by the references and that their responses will be aggregated and analyzed so that all of the information generated in a report for the hiring manager will be confidential. This statement is important because it encourages the references to provide more honest responses.

In step 82, the email is received by the computer 15 of the reference. In step 84, the reference accesses the web page generated by the computer 10 by clicking on the link provided in the email. In response, the computer transmits through the Internet 2 a dynamically generated web page form for display on the reference's computer 15 along with instructions on how to properly complete the form, a sample of which is shown in FIGS. 8A-8B.

In step 86, the reference enters via the web page form answers to the questions in the survey. For each question, the reference indicates the level of competency possessed by the job candidate using a seven-point scale. The reference is also shown the employment information submitted by the job candidate and is asked to confirm whether the information is accurate. The reference then submits the completed form to the computer 10 in step 88.

In step 90, the collection module 28 of the system 10 stores the survey data in the survey database 38. In step 92, the collection module 28 determines whether there is a sufficient number of completed surveys to provide a meaningful report to the hiring manager. For example, in one case that requires seven references, four references might be considered to provide a meaningful report. If no, then the collection module 28 waits for additional surveys to be completed. If yes, however, step 94 is executed.

Alternatively, the hiring manager has three additional options at this stage. The first option is to override the minimum number of completed surveys and to request an interim candidate report reports regardless. A second option is to set a predetermined time period from the job candidate identifies the references and checking to see whether the predetermined time period has passed. If it has, then step 94 is executed. The third option is to simply allow the hiring manger to close the job candidate's record. That option may be convenient in situations such as the job candidate voluntarily withdrawing from the job opening.

In step 94, an email to the hiring manager is generated to let him know that at least an interim report is available, which email is received by him in step 98. In step 96, reminder emails are sent to those references that have not provided the survey data within a predetermined time period.

Figure 6:
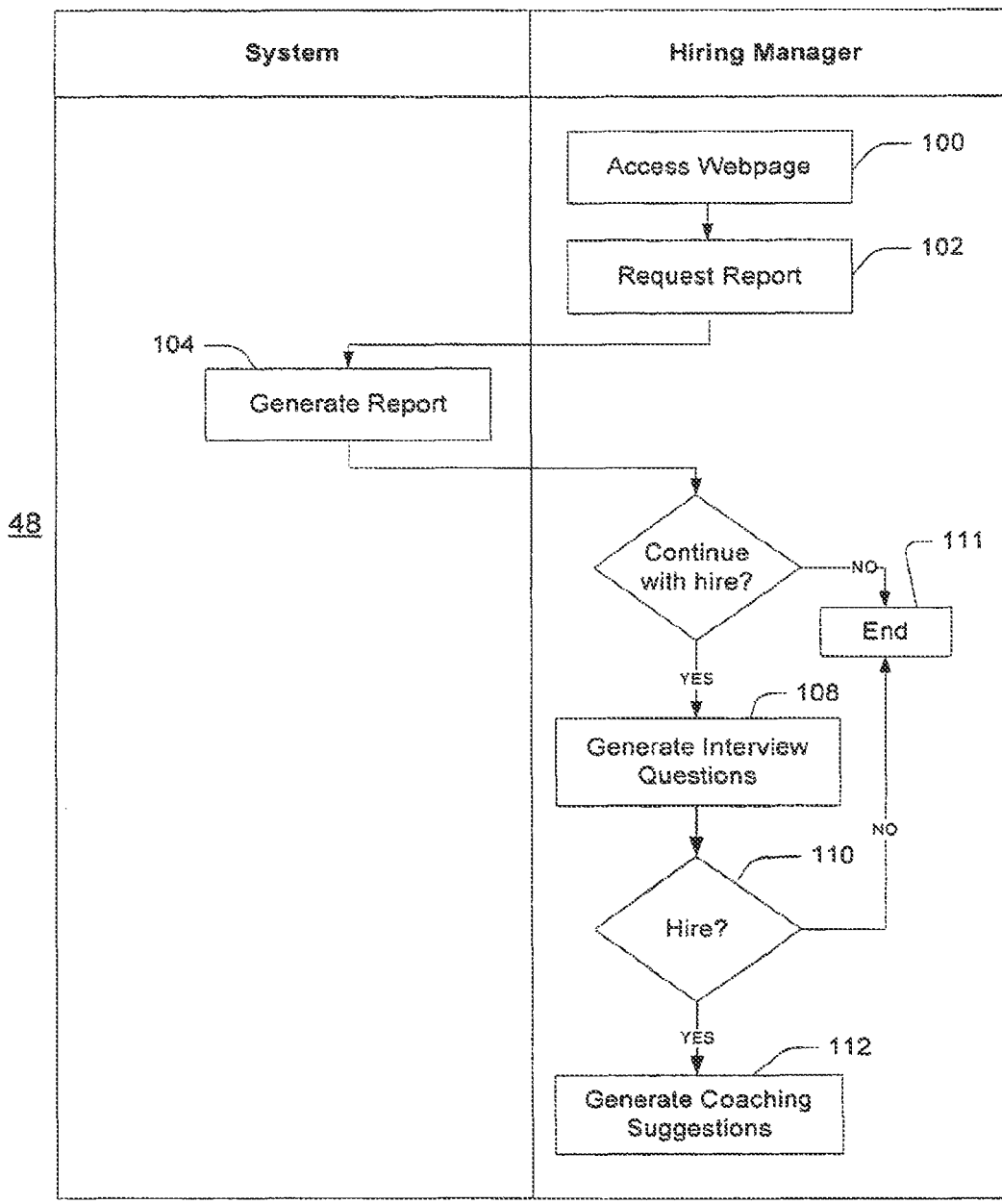
FIG. 6 illustrates a detailed process flow of an analysis step of FIG. 2.

FIG. 6 illustrates a detailed process flow of the analysis step of FIG. 2. In step 100, the hiring manager accesses the web page generated by the computer 10 by either clicking on the link provided in the email or logging on to the website of the computer 10 independent of the email. At this stage, the analysis module 30 displays a "dashboard" for the current status of the job opening. The status includes the state of each candidate's progress for the completion of the reference information. In step 102, a request for report on a particular candidate is made.

In response, the analysis module 30 in step 104 analyzes the received survey data stored in the survey database 38 and generates a candidate report. A sample report is shown in FIGS. 11A-11D.

As can be seen in FIG. 11A, the report includes a list of references, email addresses, identification of company and relation to the job candidate, dates worked by the candidate and whether the survey was completed. The report also notes any changes or discrepancies between the information provided by the candidate and the reference. For example, reference named "Roger Brown" reported that the dates worked by the candidate of "02/00 To 02/03" is different from "01/00 To 02/03". FIG. 11B explains the score for each competency in FIG. 11C which is based on benchmark scores that are stored in the benchmark database 36. The benchmark scores represent competencies that are stored on an industry-wide basis, company-wide basis or company-specific job position type basis.

As seen in FIG. 11C, scores for each question are averaged and converted to "very low" to a "very high" score. The scores to questions that are related to the same competency are averaged into the same "very low" to a "very high" score. For example, the average scores for questions 1-3 have been converted to a "Medium", "High" and "Medium", respectively. Also, the three questions are grouped into the competency of "Managing the business" and the average scores for each of questions 1-3 are averages and converted to the score of "Medium".

One third of the questions where the candidate has received the lowest raw numerical averages are weak areas the analysis module has identified and are indicated using asterisks which are used as the basis for generating interview probe questions and coaching tactics as discussed below in step 106. Alternatively, the weak areas are identified by comparing an averaged score for each question against a benchmark score from the benchmark database 36 and those scores that fall below the benchmark score by a predetermined amount are identified as the weak areas and are indicated as such using asterisks.

To further make the report useful, it may contain three additional columns: Company Comparison, Industry Comparison and Overall Rating. The Company Comparison and Industry Comparison correspond to the benchmark scores on company-wide job type basis, and industry-wide job type basis. The Overall Rating is derived from taking the average of the raw scores from each normalized database for that job type for the company, industry or other organization and the average of responses from the candidate's reference providers. This score is converted to a verbal descriptor from very-low to very-high based on lookup table for that value. For example a 4.2-5.9 inclusive, could return a "High", each descriptor range can be set based on selection standards.

As shown in FIG. 11C, questions 3, 8, 11 and 16 are highlighted using a rectangular box. The highlighted questions mean that those questions are most closely associated with high performance and retention of job candidates that have been hired which are based on a statistical analysis of performance data of the hired candidates as will be explained in detail with reference to FIG. 7.

The report also contains an overall average score ("High" in FIG. 11C) which is an average of scores from all the references for all of the questions. Alternatively, the analysis module 30 can use the correlation data from the continuous update step 50 of FIG. 2 and generate an overall score on a weighted scale in which the weight used for each question or competency is based on the correlation to the performance data with higher weight being used for higher correlation.

FIG. 11D contains the "Strengths" and "Could Improve" comments provided by the references. It is important to note that the candidate report maintains strict confidentiality of responses provided by the references. In other words, the candidate report decouples the reference individuals from the responses the reference individuals provide so as to provide anonymity of the reference individuals from the hiring company/hiring manager. This is important as it encourages the references to provide more candid responses.

FIG. 14 illustrates a group report which ranks multiple candidates. For each candidate, the group report includes averaged scores for each question, averaged score for each competency, and an overall summary score. The group report also includes questions 3, 8 and 16 which are highlighted using a rectangular box. The highlighted questions mean that those questions are most closely associated with high performance and retention of job candidates that have been hired which are based on a statistical analysis of performance data of the hired candidates.

In step 106, the hiring manager, after reviewing the report, determines whether to continue with the hiring process for the candidate. If the answer is no, then the analysis step 48 ends at step 111. If the answer is yes, the analysis step 48 continues with step 108. In step 108, the analysis module generates interview questions (see FIGS. 12A-12B) based on the identified weak areas in the report. Specifically, the interview questions are associated with the questions in the survey and are stored in the data storage 22. For each weak area, the analysis module retrieves those interview questions that are associated with the questions that correspond to the weak areas.

For example, the report in FIG. 11C has identified questions 1, 2, 7, 9, 12 and 13 as the weak areas. For those questions, the analysis module 30 retrieves associated interview questions from the data storage 22 as shown in FIGS. 12A-12B.

In step 110, the hiring manager, after having interviewed the candidate, determines whether to hire the candidate. If the decision is no, then the analysis step 48 ends. If the decision is a yes, then the analysis module in step 112 generates coaching suggestions that allow the employer to improve the identified weak areas after the candidate is hired. Like the interview questions, the coaching suggestions are associated with the questions in the survey and are stored in the data storage 22. For each weak area, the analysis module 30 retrieves those coaching suggestions that are associated with the questions that correspond to the weak areas as shown in FIGS. 13A-13C.

It is important to note that the steps of survey collection 46 and analysis 48 can be used in an iterative process to screen out job candidates. For example, a hiring manager might use a simple survey containing 4 questions against 100 job candidates to narrow the list down to 10 candidates, then design a new survey containing 16 questions to narrow the 10 candidates down to 3 candidates, and then design another survey containing 20 questions to select one candidate for hire. Accordingly, the present invention can be used to both as a screening tool and a selection tool.

Figure 7:
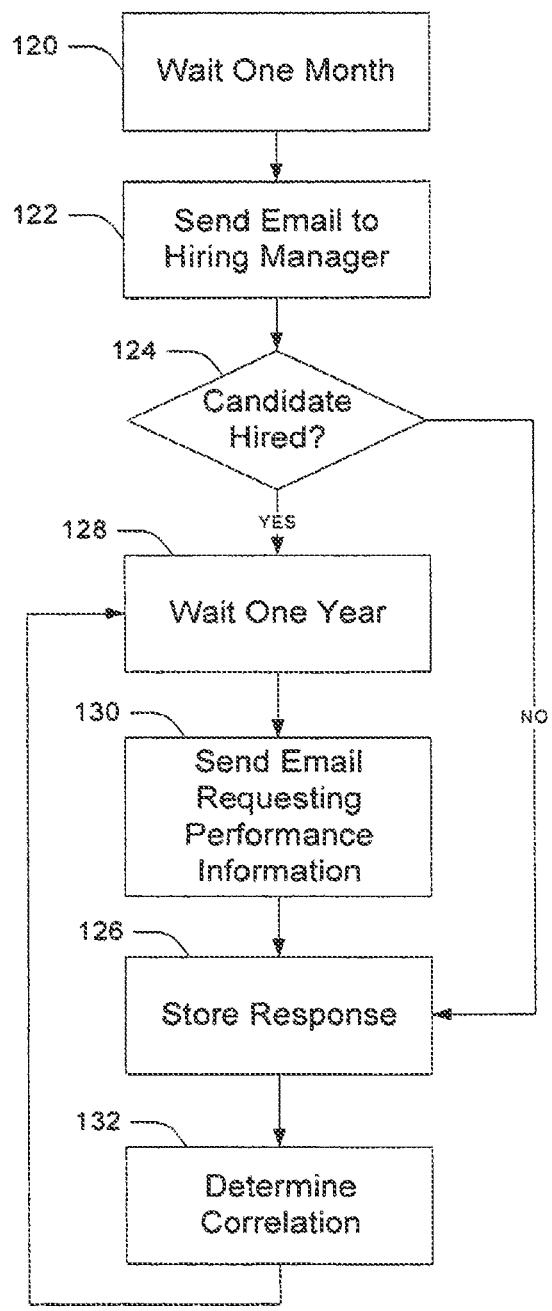
FIG. 7 illustrates a detailed process flow of a continuous update step of FIG. 2.

FIG. 7 illustrates a detailed process flow of the continuous update step of FIG. 2 which is also part of the analysis module 30. In step 120, the computer 10 waits for a predetermined time period after the final candidate report was generated. In the embodiment shown, the predetermined time period is one month. In step 122, the computer 10 prepares and sends an email to the hiring manager with a URL link to a dynamically generated web page. The web page asks whether a particular job candidate is hired. Alternatively, the email may include two links asking the hiring manager to click on one link if the candidate was hired and to click on the other link is the candidate was not hired.

In step 124, the computer 10 receives the response of the hiring manager and determines whether the job candidate was hired. If no, then that fact is noted and stored in the candidate database 34 in step 126 for later analysis and reporting. If the candidate was hired, then control passes to step 128. At step 128, the computer 10 waits for a predetermined time period after the final candidate report was generated. In the embodiment shown, the predetermined time period is one year from the final report. In step 130, the computer 10 prepares and sends an email to the hiring manager with a URL link to a dynamically generated survey web page. The survey web page asks retention and performance information. In the embodiment shown, the survey web page asks two questions: (1) is the candidate still employed; and (2) how well the candidate has performed based on a survey containing multiple questions or based on a single question on a predefined scale, e.g., scale of 1-10. In step 126, the response to the two questions from the hiring manager are stored in the candidate database 34 for later analysis and reporting.

In step 132, the analysis module 30 analyzes the hiring data stored in the candidate database 34. Specifically, the retention and performance data are statistically correlated with the various scores received by that candidate in the surveys to identify the questions where high ratings are most closely associated with high performance and retention. The correlation can be calculated on an industry-wide position type basis, on a company-wide basis without regard to the position type or on a company-wide position type basis. Thus, when the candidate reports such as shown in FIG. 11C are generated, the questions where high ratings are most closely associated with high performance and retention are graphically indicated based on the latest data accumulated up to that point.

FIG. 16 illustrates a sample report that shows the correlation between survey questions/competencies and performance of hired candidates. As shown, the report includes raw correlation scores and corresponding ratings. For example, question 3 has a raw score of 4.7 and a "Very High" rating.

These reports can be used by the hiring manager to continuously improve the survey. For example, the hiring manager can choose to delete the two questions that have the lowest correlation to the performance data and add two new questions from the competency area that has the highest correlation to the performance data. In the example shown, the two lowest scoring questions are questions 1 and 2, and the competency area having the highest score of 4.66 is "Teamwork".

Once step 132 is executed, control passes to step 128 where the computer waits a programmable amount of time usually 6 to 15 months to repeat the steps 130 to 132 to continuously monitor the performance of the job candidates that have been hired in order to continuously improve the survey questions and competency categories.

Application of the principles of the present invention are many. For example, principles of the survey selection, collection of responses and analysis of the responses can be used to evaluate a large number of vendors who supply products and services to a company through a group of buyers working for the company. The buyers for the company are acting as "reference providers". A sample vendor report as shown in FIGS. 15A-15B can be used to better manage the large number of vendors.

The foregoing specific embodiments represent just some of the ways of practicing the present invention. Many other embodiments are possible within the spirit of the invention. Accordingly, the scope of the invention is not limited to the foregoing specification, but instead is given by the appended claims along with their full range of equivalents.

What is claimed is:

1. A computer-implemented method, comprising:
generating, by at least one specialized computer system, a plurality of position specific surveys;
wherein each position specific survey comprises a plurality of survey questions specific to competency skills related to performance of at least one position;
wherein each survey question of the plurality of survey questions seeks a response in a form of a number on a numerical extent scale;
wherein each position specific survey is configured for calculating an average score in each competency skills group of the competency skills by averaging numbers of the numerical extent scale across responses received from reference providers to the plurality of survey questions so that the responses from each of reference providers are confidential from employers and job candidates;
wherein the at least one specialized computer system comprises at least one specialized computer machine comprising a non-transient memory having at least one region for storing specific computer executable program code and wherein the at least one specialized computer machine is specifically programmed to perform at least one step of the computer-implemented method;
receiving, by the at least one specialized computer system, through at least one first computer programmed interface, from at least one first employer, at least the following information:
i) job information, wherein the job information is related to at least one first position,
ii) an identity of each job candidate applying to be interviewed, and
iii) a selection identifying, from the plurality of position specific surveys, at least one first position specific survey related to at least one first position;
wherein the at least one first employer requires references from a plurality of reference providers to be received for each job candidate before the at least one first employer decides whether or not to conduct a job interview;
wherein the at least one computer system is independent from each job candidate and the at least one first employer;

wherein the job information at least identifies whether the at least one first position involves managing others;

receiving, by the at least one specialized computer system, through at least one second computer programmed interface, from a first job candidate from a plurality of job candidates applying to be interviewed, first contact information identifying the plurality of reference providers, automatically assigning, by the at least one specialized computer system, a first unique identifier to a first reference provider of the plurality of reference providers;

automatically assigning, by the at least one specialized computer system, a second unique identifier to a second reference provider of the plurality of reference providers;

automatically assigning, by the at least one specialized computer system, a third unique identifier to a third reference provider of the plurality of reference providers;

automatically transmitting, by the at least one specialized computer system, at least one first personalized request to complete the at least one first position specific survey to the first reference provider, wherein the at least one first personalized request comprises:
  i) a first URL link to access the at least one first position specific survey, and
  ii) the first unique identifier, and
  iii) information informing that responses obtained in response to the at least one first position specific survey are kept confidential from the at least one first employer and the first job candidate;

automatically transmitting, by the at least one specialized computer system, at least one second personalized request to complete the at least one first position specific survey to the second reference provider, wherein the at least one second personalized request comprises:
  i) a second URL link to access the at least one first position specific survey, and
  ii) the second unique identifier, and
  iii) the information informing that the responses obtained in response to the at least one first position specific survey are kept confidential from the at least one first employer and the first job candidate;

automatically transmitting, by the at least one specialized computer system, at least one third personalized request to complete the at least one first position specific survey to the third reference provider, wherein the at least one third personalized request comprises:
  i) a third URL link to access the at least one first position specific survey, and
  ii) the third unique identifier, and
  iii) the information informing that the responses obtained in response to the at least one first position specific survey are kept confidential from the at least one first employer and the first job candidate;

causing to display, by the at least one specialized computer system, through at least one second computer interface, the at least one first position specific survey to the first, the second and the third reference providers in response to:
  i) the first, the second and the third URL links being activated respectively and
  ii) the first, the second and the third unique identifiers being supplied respectively;

receiving, by the at least one specialized computer system, from the first, the second and the third reference providers, the responses to the at least one first position specific survey;

calculating, by the at least one specialized computer system, each average score of the first job candidate in each competency skills group of the competency skills based on the responses in each competency skills group of the first, the second and the third reference providers;

generating, by the at least one specialized computer system, for the at least one first employer, at least one reference report related to the first job candidate, wherein the at least one reference report comprises average scores of the first job candidate in the competency skills groups of the at least one first position specific survey, calculated based on the responses of the first, the second and the third reference providers so as to maintain the confidentiality of the responses of the plurality of reference providers from the at least one first employer and the first job candidate;

wherein the average scores of the first job candidate are benchmarked against average scores of other job candidates who applied to a specific position that is at least similar to the at least one first position; and wherein the at least one reference report is configured to allow the at least one first employer to decide whether or not to conduct the job interview with the first job candidate who has applied to be interviewed.

2. The computer method of claim 1, wherein the average scores of the first job candidate are benchmarked on a company-wide basis.

3. The computer method of claim 1, wherein the average scores of the first job candidate are benchmarked on an industry-wide basis.

4. The computer method of claim 1,
wherein the first contact information identifies a first email address, a second email address, and a third email address for the first, the second and the third reference providers, respectively;

wherein the receiving the first contact information identifying the at least three reference providers further comprises:
  validating domain portions of the first, the second, and the third email addresses against registered Internet locations, respectively, based at least in part on at least one industry standard database of the Internet locations;

wherein the automatically transmitting the at least one first personalized request to complete the at least one first position survey to the first reference provider comprises:
  sending the at least one first personalized request to the validated first email address;

wherein the automatically transmitting the at least one second personalized request to complete the at least one first position survey to the second reference provider comprises:
  sending the at least one second personalized request to the validated second email address; and wherein the automatically transmitting the at least one third personalized request to complete the at least one first position survey to the third reference provider comprises:
  sending the at least one third personalized request to the validated second email address.

5. A computer system, comprising:

at least one specialize computer machine, comprising:
- a non-transient memory having at least one region for storing particular computer executable program code; and
- at least one processor for executing the particular program code stored in the memory, wherein the particular program code is configured to at least perform the following operations:

generating a plurality of position specific surveys;

wherein each position specific survey comprises a plurality of survey questions specific to competency skills related to performance of at least one position;

wherein each survey question of the plurality of survey questions seeks a response in a form of a number on a numerical extent scale;

wherein each position specific survey is configured for calculating an average score in each competency skills group of the competency skills by averaging numbers of the numerical extent scale across responses received from reference providers to the plurality of survey questions so that the responses from each of reference providers are confidential from employers and job candidates;

receiving, through at least one first computer programmed interface, from at least one first employer, at least the following information:
- i) job information, wherein the job information is related to at least one first position,
- ii) an identity of each job candidate applying to be interviewed, and
- iii) a selection identifying, from the plurality of position specific surveys, at least one first position specific survey related to at least one first position;

wherein the at least one first employer requires references from a plurality of reference providers to be received for each job candidate before the at least one first employer decides whether or not to conduct a job interview;

wherein the at least one computer system is independent from each job candidate and the at least one first employer;

wherein the job information at least identifies whether the at least one first position involves managing others;

receiving, through at least one second computer programmed interface, from a first job candidate from a plurality of job candidates applying to be interviewed, first contact information identifying the plurality of reference providers, automatically assigning a first unique identifier to a first reference provider of the plurality of reference providers;

automatically assigning a second unique identifier to a second reference provider of the plurality of reference providers;

automatically assigning a third unique identifier to a third reference provider of the plurality of reference providers;

automatically transmitting at least one first personalized request to complete the at least one first position specific survey to the first reference provider, wherein the at least one first personalized request comprises:
- i) a first URL link to access the at least one first position specific survey, and
- ii) the first unique identifier, and
- iii) information informing that responses obtained in response to the at least one first position specific survey are kept confidential from the at least one first employer and the first job candidate;

automatically transmitting at least one second personalized request to complete the at least one first position specific survey to the second reference provider, wherein the at least one second personalized request comprises:
- i) a second URL link to access the at least one first position specific survey, and
- ii) the second unique identifier, and
- iii) the information informing that the responses obtained in response to the at least one first position specific survey are kept confidential from the at least one first employer and the first job candidate;

automatically transmitting at least one third personalized request to complete the at least one first position specific survey to the third reference provider, wherein the at least one third personalized request comprises:
- i) a third URL link to access the at least one first position specific survey, and
- ii) the third unique identifier, and
- iii) the information informing that the responses obtained in response to the at least one first position specific survey are kept confidential from the at least one first employer and the first job candidate;

causing to display, through at least one second computer interface, the at least one first position specific survey to the first, the second and the third reference providers in response to:
- i) the first, the second and the third URL links being activated respectively and
- ii) the first, the second and the third unique identifiers being supplied respectively;

receiving, from the first, the second and the third reference providers, the responses to the at least one first position specific survey;

calculating each average score of the first job candidate in each competency skills group of the competency skills based on the responses in each competency skills group of the first, the second and the third reference providers;

generating, for the at least one first employer, at least one reference report related to the first job candidate, wherein the at least one reference report comprises average scores of the first job candidate in the competency skills groups of the at least one first position specific survey, calculated based on the responses of the first, the second and the third reference providers so as to maintain the confidentiality of the responses of the plurality of reference providers from the at least one first employer and the first job candidate;

wherein the average scores of the first job candidate are benchmarked against average scores of other job candidates who applied to a specific position that is at least similar to the at least one first position; and wherein the at least one reference report is configured to allow the at least one first employer to decide whether or not to conduct the job interview with the first job candidate who has applied to be interviewed.

6. The computer system of claim 5, wherein the average scores of the first job candidate are benchmarked on a company-wide basis.

7. The computer system of claim 5, wherein the average scores of the first job candidate are benchmarked on an industry-wide basis.

8. The computer system of claim 5,
wherein the first contact information identifies a first email address, a second email address, and a third email address for the first, the second and the third reference providers, respectively;
wherein the receiving the first contact information identifying the at least three reference providers further comprises:
validating domain portions of the first, the second, and the third email addresses against registered Internet locations, respectively, based at least in part on at least one industry standard database of the Internet locations;
wherein the automatically transmitting the at least one first personalized request to complete the at least one first position survey to the first reference provider comprises:
sending the at least one first personalized request to the validated first email address;
wherein the automatically transmitting the at least one second personalized request to complete the at least one first position survey to the second reference provider comprises:
sending the at least one second personalized request to the validated second email address; and
wherein the automatically transmitting the at least one third personalized request to complete the at least one first position survey to the third reference provider comprises:
sending the at least one third personalized request to the validated second email address.

* * * * *